(12) United States Patent
Powers et al.

(10) Patent No.: US 7,595,278 B2
(45) Date of Patent: Sep. 29, 2009

(54) RESIN BONDED SORBENT

(75) Inventors: Thomas Powers, Mayville, NY (US); Samuel A. Incorvia, North Tonawanda, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 643 days.

(21) Appl. No.: 11/335,108

(22) Filed: Jan. 19, 2006

(65) Prior Publication Data

US 2006/0166819 A1    Jul. 27, 2006

Related U.S. Application Data

(63) Continuation-in-part of application No. 11/040,471, filed on Jan. 21, 2005.

(51) Int. Cl.
    *B01J 20/26* (2006.01)
(52) U.S. Cl. ............................ 502/402; 502/417
(58) Field of Classification Search ............... 502/402, 502/417, 401
    See application file for complete search history.

(56) References Cited

U.S. PATENT DOCUMENTS

| | | | |
|---|---|---|---|
| 3,091,550 A | | 5/1963 | Doying |
| 3,375,933 A | | 4/1968 | Rodman |
| 3,454,502 A | | 7/1969 | Hiltgen et al. |
| 3,538,020 A | | 11/1970 | Heskett et al. |
| 3,687,297 A | | 8/1972 | Kuhn et al. |
| 3,704,806 A | | 12/1972 | Plachenov et al. |
| 3,833,406 A | | 9/1974 | White |
| 4,013,566 A | * | 3/1977 | Taylor ................... 502/62 |
| 4,109,431 A | | 8/1978 | Mazzoni et al. |
| 4,864,071 A | * | 9/1989 | Hirai et al. ............. 585/829 |
| 5,078,909 A | | 1/1992 | Shigeta et al. |
| 5,114,584 A | | 5/1992 | Sheckler et al. |
| 5,432,214 A | | 7/1995 | Lancesseur |
| 5,505,892 A | | 4/1996 | Domme |
| 5,684,094 A | | 11/1997 | Suzuki et al. |
| 5,911,937 A | | 6/1999 | Hekal |
| 5,966,810 A | | 10/1999 | Chisnell et al. |
| 6,103,141 A | | 8/2000 | Incorvia et al. |
| 6,124,006 A | | 9/2000 | Hekal |
| 6,133,193 A | * | 10/2000 | Kajikawa et al. ............ 502/402 |
| 6,167,720 B1 | | 1/2001 | Chisnell |
| 6,214,255 B1 | | 4/2001 | Hekal |
| 6,318,115 B1 | | 11/2001 | Kirchner et al. |
| 6,430,958 B1 | | 8/2002 | Corrigan et al. |
| 6,438,972 B1 | | 8/2002 | Pickett, Jr. et al. |
| 6,457,294 B1 | | 10/2002 | Virnelson et al. |
| 6,460,271 B2 | | 10/2002 | Hekal |
| 6,465,532 B1 | | 10/2002 | Hekal et al. |
| 6,562,452 B2 | | 5/2003 | Ferri |
| 6,568,204 B2 | | 5/2003 | Fisk et al. |
| 6,569,532 B2 | | 5/2003 | Tomiyoshi et al. |
| 6,613,405 B1 | | 9/2003 | Hekal |
| 6,615,609 B2 | | 9/2003 | Kawasaki et al. |
| 6,617,381 B1 | | 9/2003 | Kumaki et al. |
| 6,688,468 B2 | | 2/2004 | Waterman |
| 6,705,463 B1 | | 3/2004 | Bucholtz et al. |
| 6,769,558 B1 | | 8/2004 | Bucholtz |
| 2005/0089687 A1 | | 4/2005 | Judek et al. |

FOREIGN PATENT DOCUMENTS

FR        2660634        10/1991

OTHER PUBLICATIONS

Heat and Mass Transfer Characteristics of Desiccant Polymers by JoAnna Christen Staton, B.S. Virginia Polytechnic Institute and State University, Blacksburg, Virginia—May 1998.

* cited by examiner

*Primary Examiner*—Edward M Johnson
(74) *Attorney, Agent, or Firm*—Simpson & Simpson, PLLC (57) ABSTRACT

The invention relates to improved resin bonded sorbent compositions and articles of manufacture fabricated therewith, such as air conditioning and refrigeration components. The introduction of desiccants into resinous molding compositions enables the elimination of more conventional bagged desiccant containments. The novel molding compositions of the invention and parts fabricated therewith are multi-functional, beneficially combining structural, mechanical and adsorptive capabilities without requiring the usual reinforcing additives. Consequently, with the omission of reinforcing additives the novel molding compositions of the invention are further characterized by higher moisture adsorptive capacities by allowing for higher sorbent loading factors than prior adsorbent-containing molding compositions.

18 Claims, 5 Drawing Sheets

RESIN BONDED SORBENT

CROSS REFERENCE TO RELATED APPLICATION

This application is a Continuation-in-Part of application Ser. No. 11/040,471, filed Jan. 21, 2005.

FIELD OF THE INVENTION

The present invention relates generally to molding compositions, and more particularly, to improved injection molding compositions and articles of manufacture fabricated therefrom comprising water adsorbing additives in a resinous base.

BACKGROUND OF INVENTION

Incorporation of sorbents or desiccants into resin matrices has been revealed in several contexts. Formation of these resins into structural or functional shapes by various processes has been described in certain applications. Similarly, fillers have been added to structural molding resins. Low cost mineral or other fillers have been added to resin-containing compositions to extend the resin and reduce costs, while maintaining strength sufficient for the intended end-use application of the molded article. It is also a frequent practice to add reinforcing materials, such as glass fibers or beads to enhance mechanical properties of molding resins, e.g., hardness, tensile displacement, and so on. With reinforcing additives, just as with fillers, it has been found there are ranges within which the desired effects of extending the resin or reinforcing the molded article are accomplished while maintaining satisfactory injection molding and mechanical properties.

Nevertheless, molding compositions comprising reinforcing additives have not been entirely satisfactory for a number of end-use applications. For example, molding composition having relatively high loading levels of reinforcing additives, such as glass fibers and glass beads have the affect of limiting the loading factor of desiccant additives which may be introduced into such molding compositions for optimal moisture adsorption performance. However, with a corresponding reduction in the loading of reinforcing additives and an increase in the loading of desiccant additives there was also a potential for a reduction in desirable mechanical properties, such as hardness, tensile strength, and other mechanical properties.

Accordingly, there is a need for improved resinous molding compositions, and more particularly, injection molding compositions and articles of manufacture made therefrom, wherein the compositions and manufactured articles retain high loading levels of desiccant additives without off-setting desirable mechanical properties of the resins.

SUMMARY OF INVENTION

It is therefore a principal object of the invention to provide improved multifunctional resinous molding compositions with a high level of moisture adsorbing properties without substantial trade-offs in mechanical properties.

The present invention comprises at least a "resin bonded sorbent" composition comprising a resin and a sufficient amount of sorbent to remove moisture from the environment the molded article will be used in. That is to say, one principal aspect of the invention relates to multifunctional molding compositions having at least a moisture adsorbing amount of a sorbent in combination with a resin. The sorbent-resin combination is present in the composition as a resin bonded sorbent. The molding composition is further characterized by enhanced mechanical properties in the absence of an additive having a utility generally recognized for reinforcing articles of manufacture fabricated from resinous molding compositions.

The invention further relates to multifunctional sorbent-resin molding compositions comprising moisture adsorbing-mechanical property enhancing amounts of adsorbent in combination with reinforcing additives and resin, wherein reduced amounts of reinforcing additives can be employed than otherwise normally required for enhanced mechanical properties. Surprisingly, these inventors discovered that mechanical properties of molding resins can be enhanced with the introduction of sorbents/desiccants thereby allowing for the introduction of reduced amounts of further additives specifically intended for enhancing mechanical properties of sorbent modified injection molding resins, such as glass fibers and glass beads. This is believed to be especially significant because with higher loadings of molding compositions with reinforcing agents this can actually have a deleterious or degrading effect on the strength of molded articles fabricated therewith. Accordingly, it is a further object of the invention to provide for sorbent-containing molding compositions wherein the mechanical properties imparted by the adsorbent enables usage of lesser amounts of mechanical strength enhancing additives specifically intended for reinforcing resinous molding compositions.

In particular, the multifunctional molding compositions of the invention may comprise from about 25 to about 55 wt % sorbent, such as a molecular sieve, and from about 45 to about 75 wt % resin, usually a thermoplastic material, either homopolymeric type or copolymer having two or more comonomers. One preferred group of representative resins are the polyamides. A preferred amount of sorbent is in the range from about 35 to about 42 wt %, and more preferably, an amount of about 40 wt %. One representative preferred molecular sieve is a 4A molecular type; however, other sieves may be used selected from both natural and artificial zeolites.

For purposes of this invention the expression "resin bonded sorbent", as appearing in the specification and claims, is intended to mean a surface compatibility occurring between the sorbent and the resin through a loss of crystallinity of the resin, whereby the sorbent becomes wetted and miscible with the resin due to a reduction in surface tension. The expression "resin bonded sorbent" is intended to include binding between the resin and sorbent, which can occur, for example, through heating the sorbent with the resin, or which can be bound through suitable, non-contaminating coupling, surfactant or compatibilizing agents, discussed in greater detail below.

It is still a further principal object of the invention to provide molded articles of manufacture fabricated from the resin bonded adsorbent compositions as disclosed herein, and more particularly, to provide molded components, such as refrigeration cycle and air conditioner components made from molding compositions comprising generally from about 25 to about 55 wt % sorbent, e.g., molecular sieve, and from about 45 to about 75 wt % resin, e.g., polyamide. In the case of most mobile refrigeration systems, due to performance issues, often there are preferably no other materials mixed with the resin/sorbent combination, as defined herein.

Still another aspect of the present invention comprises methods for making improved articles of manufacture, such as components for vehicular air conditioning systems which can eliminate the usual desiccant bag, including refrigeration systems comprising the steps of forming a composition comprising at least from about 25 to about 55 wt % sorbent, such as a molecular sieve, e.g., both natural and artificial zeolites, and from about 45 to about 75 wt % resin, and then molding a component from the compositions, such as by injection molding processes.

BRIEF DESCRIPTION OF THE DRAWINGS

The features of the invention believed to be novel and the elements characteristic of the invention are set forth with particularity in the appended claims. The figures are for illustration purposes only and are not necessarily drawn to scale. The invention itself, however, both as to organization and method of operation, may best be understood by reference to the detailed description which follows taken in conjunction with the accompanying drawings in which:

DETAILED DESCRIPTION OF THE INVENTION

It would be desirable for reasons of cost and productivity to incorporate a sorbent into a resin, and in particular one suitable for injection molding, in such a way that its adsorptive properties are preserved and the molding properties of the resin are maintained without degrading mechanical properties. Surprisingly, the novel molding compositions of the invention and parts fabricated therewith are multi-functional, beneficially combining structural, mechanical and adsorptive capabilities without requiring the usual reinforcing additives. Consequently, with the omission of reinforcing additives the novel molding compositions of the invention are further characterized by higher moisture adsorptive capacities by allowing for higher sorbent loading factors than prior adsorbent-containing molding compositions.

Serendipitously, it was discovered as a part of the present invention, that sorbents of the "resin bonded sorbent" molding compositions have the beneficial effect of imparting reinforcement to the molding compositions of the invention while retaining their moisture adsorptive capacity, but without requiring the usual and customary strengthening additives, such as glass beads, glass fiber, and the like. This allows for higher loading factors of sorbent additives for maximizing adsorptive properties of the molding composition without trade-offs occurring in terms of significantly altered mechanical properties of the molding composition.

While the present invention relates principally to the discovery that the mechanical properties of molding resins comprising sorbent additives are capable of eliminating the usual requirement specifically for reinforcement additives, such as glass beads and glass fibers, the invention also contemplates multifunctional sorbent-resin molding compositions comprising moisture adsorbing-mechanical property enhancing amounts of adsorbent in combination with reinforcing additives and resin, wherein reduced amounts of reinforcing additives can be employed than otherwise normally required for enhanced mechanical properties. That is, the invention also provides desiccant-containing molding compositions, but with reduced quantities of strength enhancing additives, such as glass fibers and glass beads. This will enhance the mechanical properties of the molding composition without the potential for degrading the strength characteristics of the molded article. More specifically, proportional ranges of sorbent, reinforcing additives and resin can be from about 25 to about 50 Wt % sorbent; from about 5 to about 15 wt % reinforcing additive and from about 45 to about 70 wt % resin.

It has also been found as a part of the present invention that, within limits, the resins can be processed and formed by several techniques, including modern high-speed injection molding processes into fully functional component parts, including parts for various sealed systems and assemblies. In these later applications, the structural and functional features of the inventive concepts are served while ambient and ingressed moisture are adsorbed to protect sensitive materials or components of systems or assemblies from degradation by moisture; e.g. hydrolysis or corrosion.

In accordance with the above, the present invention comprises reinforced structural resin compositions suitable for injection molding with improved mechanical properties, satisfactory melt handling properties, and substantial moisture adsorption properties. Most thermoplastic resins are suitable for use in the resin bonded adsorbent compositions of the invention, and include homopolymers and copolymers comprising two or more monomers. Representative examples include the polyamides, such as Nylon 6; Nylon 6,6; Nylon 610, and so on. Other representative examples include the polyolefins, such as high and low density polyethylenes, polypropylene; copolymers of ethylene-vinyl acetate; polystyrene; polyesters, e.g., PET, to name but a few.

As previously discussed, according to one aspect of the invention, compositions of the present invention may comprise from about 25 to about 55 wt % sorbent and the balance resin, and more specifically, from about 25 to about 45 wt % sorbent with the balance resin. More preferred compositions may comprise from about 35 to about 42 wt % sorbent, such as a molecular sieve, and the balance resin. A most preferred resin bonded sorbent composition may comprise from about 60% nylon molding resin, such as Zytel® 101, commercially available from E.I. duPont, compounded with 40% molecular sieve, such as W. R. Grace 4A molecular sieve powder. The molecular sieves of the invention can have a nominal pore size of 4 Å, and a particle size range of about 0.4 to about 32μ. It is to be noted, however, that other molecular sieve pore-sizes can be used as well, such as 3 Å, 5 Å, or 10 Å, for example.

Generally, sorbents which are useful and functional in this invention are those which bond mechanically to the resin without special additives, such as molecular sieve, as previously discussed. Still others, according to then instant invention, can be induced to bond to the resin through use of a suitable additive, i.e., bind with the aid of a coupling or compatibilizing agent. In addition to molecular sieve, other representative sorbents that are useful in the compositions of the invention include silica gel, activated carbon, activated alumina, clay, other natural zeolites, and combinations thereof. Those sorbents found to perform with coupling or compatibilizing agents include such members as activated carbon and alumina.

The additives which perform as compatibilizers fall into either of two categories, namely those which bond with the resin or the sorbent, and those having some affinity with both resin and sorbent, and act as solid state surfactants. Reactive coupling agents include such classes as maleates, epoxies and silanes. More specifically, reactive coupling agents include such representative examples as maleic anhydride grafted polymers used in amounts ranging from about 2 to about 5 Wt %. In particular, they can include such representative examples as maleic anhydride grafted to polypropylene or ABS resins, the later being useful as coupling agents with styrenic polymers. Similarly, silanes with various functional groups attached may be used.

The present invention also contemplates the use of so called non-reactive type compatibilizing agents in binding sorbent and resin. This comprises such representative examples as metals (e.g., zinc or sodium), acrylates, stearates and block copolymers, e.g., zinc stearate, sodium stearate in a range from about 0.01 to about 0.02 wt % based of the sorbent. The actual level is driven by the surface area, which is in-turn proportional to the particle size. For a molecular sieve with mean particle size of 10μ, 100 ppm of aluminum stearate would be a typical starting level for compatiblization with a polyamide resin.

The resin bonded sorbent compositions may be prepared in accordance with the present invention using plastic compounding techniques generally familiar among ordinary skilled artisans. Molecular sieve, a preferred sorbent, may be incorporated into the resin, e.g., polyamide, polyolefin, or the like, by feeding the sorbent in powdered format along with beads of the chosen resin to a plastics extruder with good mixing characteristics. A twin-screw extruder is typically used. Here, the resin is melted and the sorbent mixed throughout. It is a necessary condition that the melt blend be heated above the melt point of the resin as determined by DSC (differential scanning calorimetry). That is, in preparing the resin bonded sorbents of the invention, the temperature should be raised to the point where all crystallinity is lost in order to achieve complete miscibility of the sorbent in the resin melt. For example, DuPont's Zytel® 101 polyamide resin would be heated above 262° C. The extruded resin is cooled and then cut or crushed into pellets or granules. Because compounding is performed at elevated temperatures, the sorbent tends not to adsorb moisture during this processing period, but retains its adsorption capacity when molded into a component part and installed in a working environment.

One further advantage realized with the resin bonded sorbent system of the present invention, wherein the resin and sorbent are intimately bonded, is that gram for gram it is more effective than adsorbent systems employing a bagged adsorbent. According to earlier methods wherein bags were used for containerizing sorbent, the sorbent required beading to prevent it from entering the refrigerant stream, for example. This required the sorbent to be bonded within a binder resin, typically 15 wt % binder, such as in the form of a powder. Thus, when 40 grams of a commercially prepared sorbent was placed into a bag, in reality only 34 grams of sorbent were introduced into the system (with 6 grams of binder). In contradistinction, the resin bonded sorbents of the present invention require no additional binder resin because the sorbent is placed directly into the molding resin from which the components are fabricated. Advantageously, with the immediate invention, no intermediary binder resin is required, allowing for higher sorbent loading factors than otherwise achieved with the usual bagged sorbents.

Figure 1:
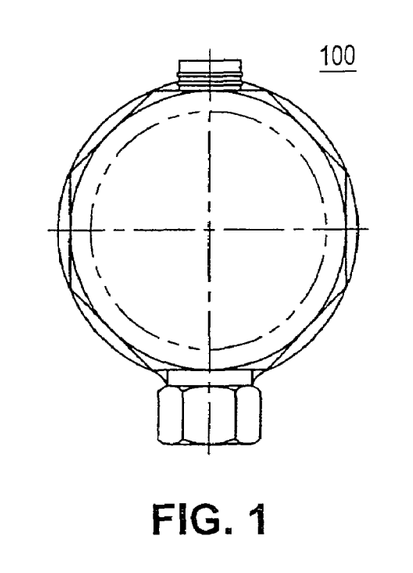
FIG. 1 is an end view of an accumulator in accordance with the present invention.
Figure 2:
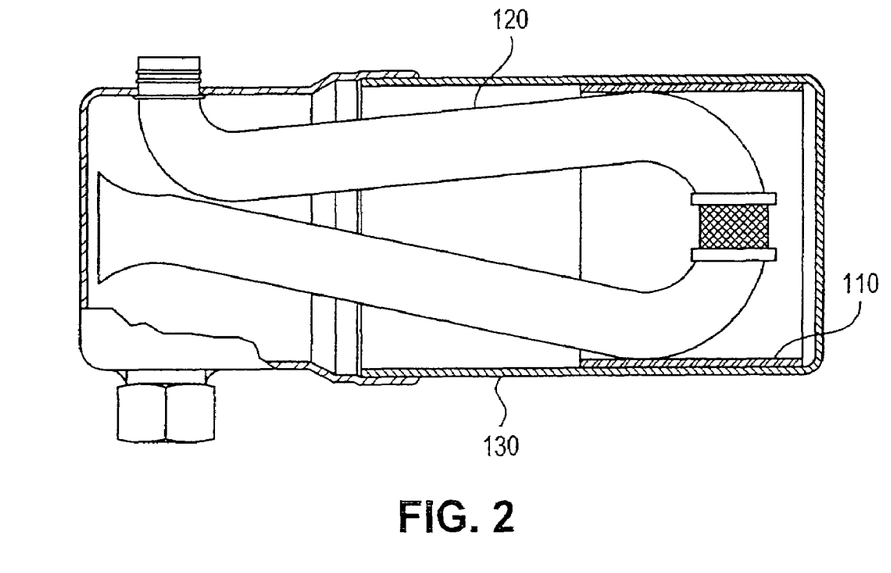
FIG. 2 is a partial cross sectional side view of an accumulator in accordance with the present invention.

The compounded resin blend of the invention, previously discussed, can then be injection molded in the form of a part. An exemplary part is a refrigerant vapor liquid separator, such as is used in the receiver of an automotive air conditioning system. The strength of the silicate-reinforced resin results in a structurally sound molded part. As such, it is self-supporting and suitable for mounting in the same ways that metal or plastic refrigeration components are presently mounted. See, for example, FIGS. 1 and 2, which show an end and partial cross sectional side view, respectively, of a U-Tube assembly 100. This embodiment, which uses the composition of the present invention to form a liner or sleeve 110 out of the resin bonded sorbent of the present invention, contains a U-tube 120 within accumulator canister 130. This design provides a means of drying against an exposed inner surface of liner 110. This embodiment is an alternative to a "baffle" type accumulator of the prior art (not shown).

Alternatively, the resin formed in accordance with the present invention, instead of being melted and injection molded into a functional sorbent part, may be milled or otherwise formed or pelletized into pieces which are then sintered into parts, such as a flow-through monolith structure, or a flow-through dryer component. In this case, the part is not injection molded, but is molded from the compounded sorbent-loaded resin into a functional part having sufficient porosity for its intended application, such as for use in a receiver dryer assembly.

Parts fabricated from the resin bonded sorbents of the present invention are particularly well suited to replace multiple-component parts of the prior art. For example, in the past many specialized structures have been developed to fit and secure a desiccant material (which was loose) in various parts of a refrigeration system. Welded or sewn bags containing beaded or granular molecular sieve or aluminum oxide would be disposed within a flow path. Additionally, and specifically with respect to stationary refrigeration applications, beads or granules of desiccant were bonded together in a heated mold with a suitable heat-cured resin or ceramic binder to produce a rigid shape which would serve as a drying block or partial filter. Such a structure would be built into a housing. These solutions, however, involved complicated multiple part pieces. The present invention, however, joins the performance of the desiccant with the structural purpose of a part such that a one-piece device serves both functions simultaneously.

Figure 3:
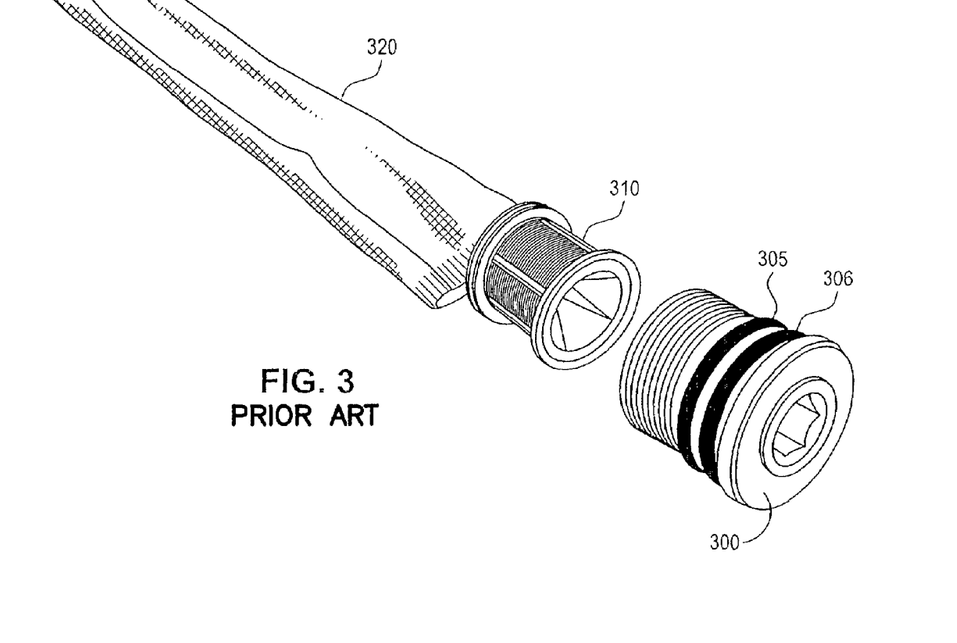
FIG. 3 is an exploded view of a filter/desiccant bag/aluminum fitting component of a refrigeration system in accordance with the prior art.
Figure 4:
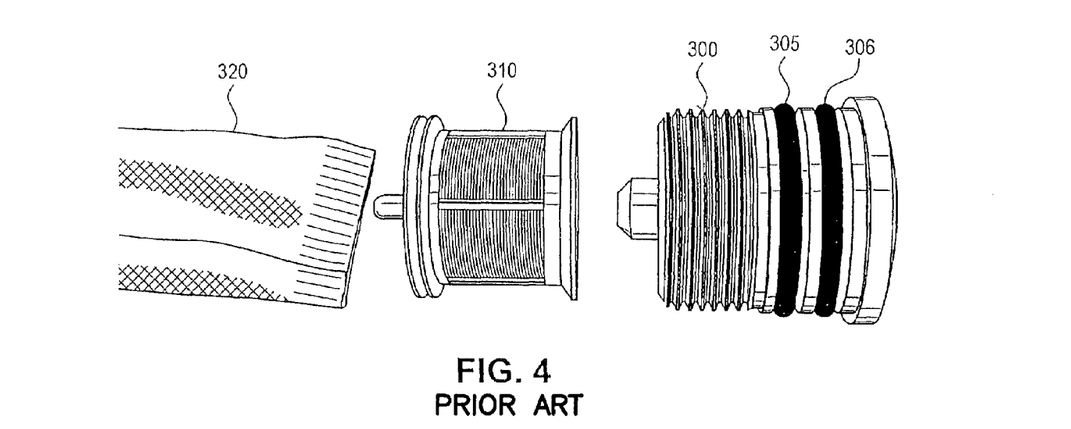
FIG. 4 is a side view of the component of FIG. 3.
Figure 5:
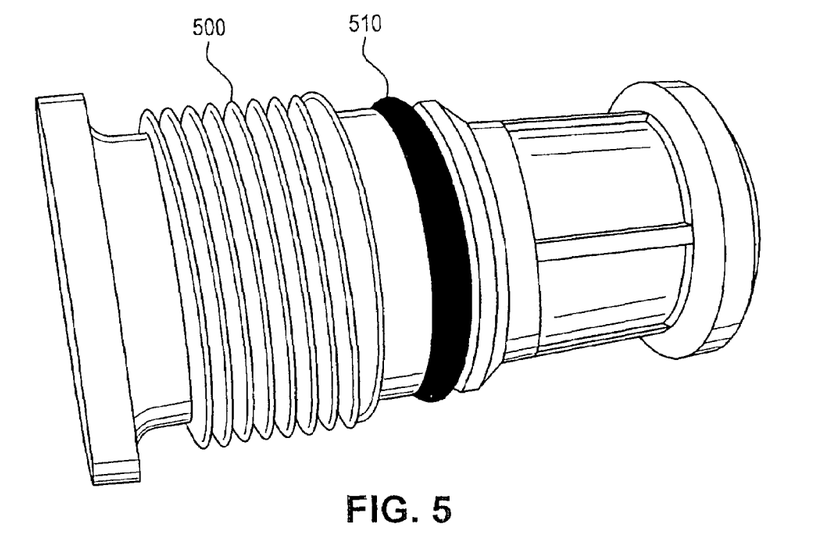
FIG. 5 is a one-piece filter/fitting made in accordance with the composition of the present invention.
Figure 6:
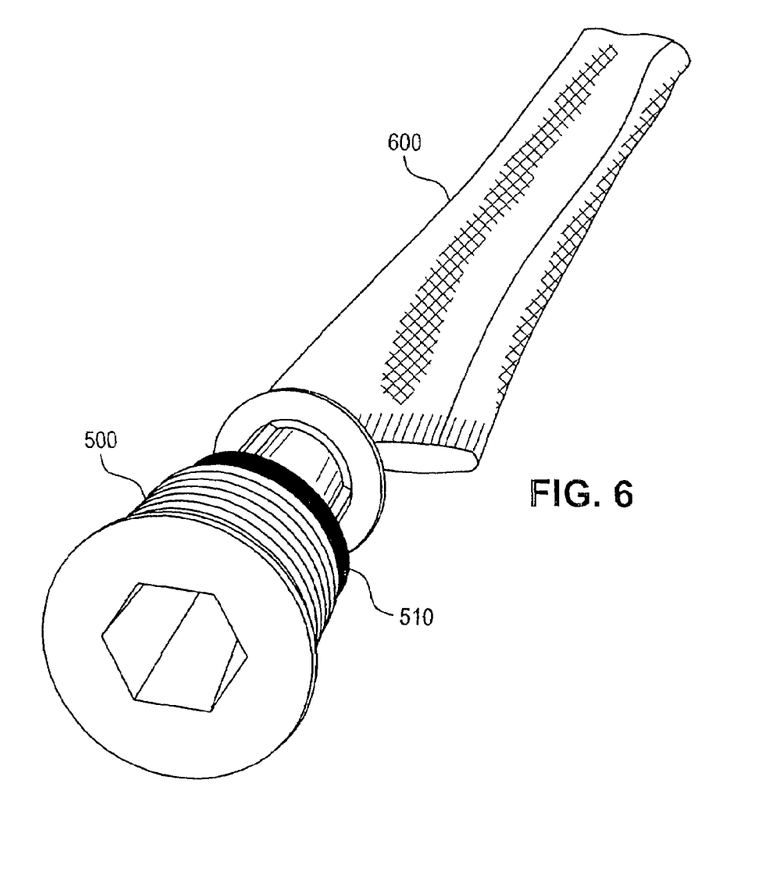
FIG. 6 is an illustration of the use of the device shown in FIG. 5 along with a desiccant bag.
Figure 7:
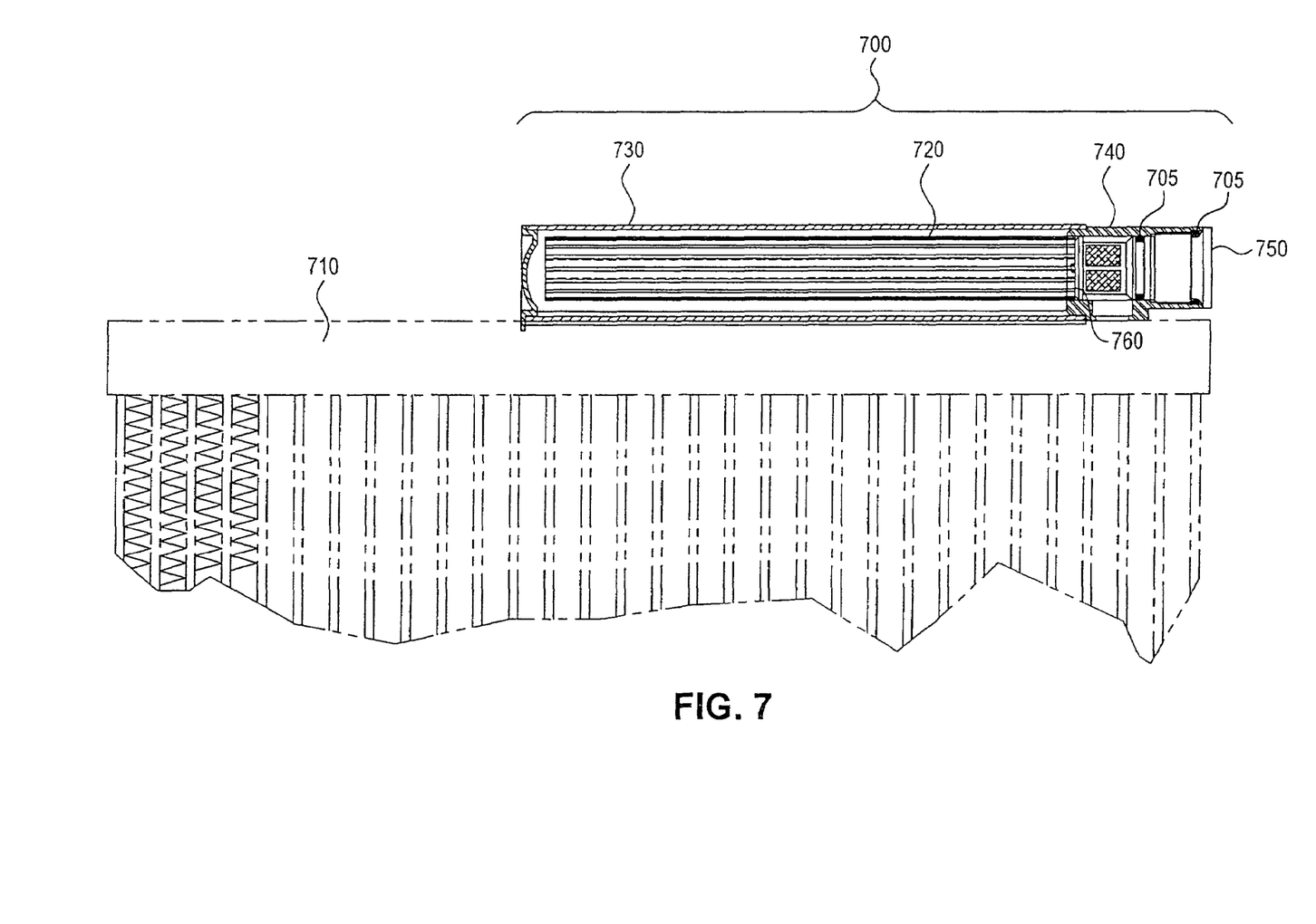
FIG. 7 shows a cross sectional view of an embodiment of the part shown in FIG. 5 in use atop a condenser.

For example, the present invention is contemplated for use with an Integrated Receiver Dehydrator Condenser, such as those which are starting to find their way into a growing number of vehicles. Such mobile refrigeration cycle components basically combine the drying function with the condenser for a number of reasons. It reduces the number of system components, therefore making better use of underhood space, and concomitantly reduces the number of fittings and connections minimizing the potential for system leaks. It also has some performance gains relative to cooling efficiencies. The current technology is illustrated in FIGS. 3 and 4 which show aluminum threaded plug 300 with O-rings 305 and 306, an injection molded filter 310, and desiccant bag 320. By converting this system to a one-piece injection molded plug/filter assembly, such as that shown in FIG. 5, a one piece plug 500 with O-ring 510 can be utilized. In such a case, plug 500 could be assembled with desiccant bag 600 as shown in FIG. 6. FIG. 7 illustrates a partial cross section of the device assembled.

More specifically, FIG. 7 shows the device 700 disposed adjacent condenser 710. Device 700 is comprised of desiccant bag 720 disposed within receiver dryer tube 730. On the end of device 700 is filter tube 740 housing integral threaded plug and filter 750. O-rings 705 are also shown. Desiccant bag 720 is connected to integral threaded plug and filter 750 at interface 760. This design would eliminate all the separate assembly steps and create a part with fewer separate pieces, as compared to the aluminum threaded plug described above.

Figure 8:
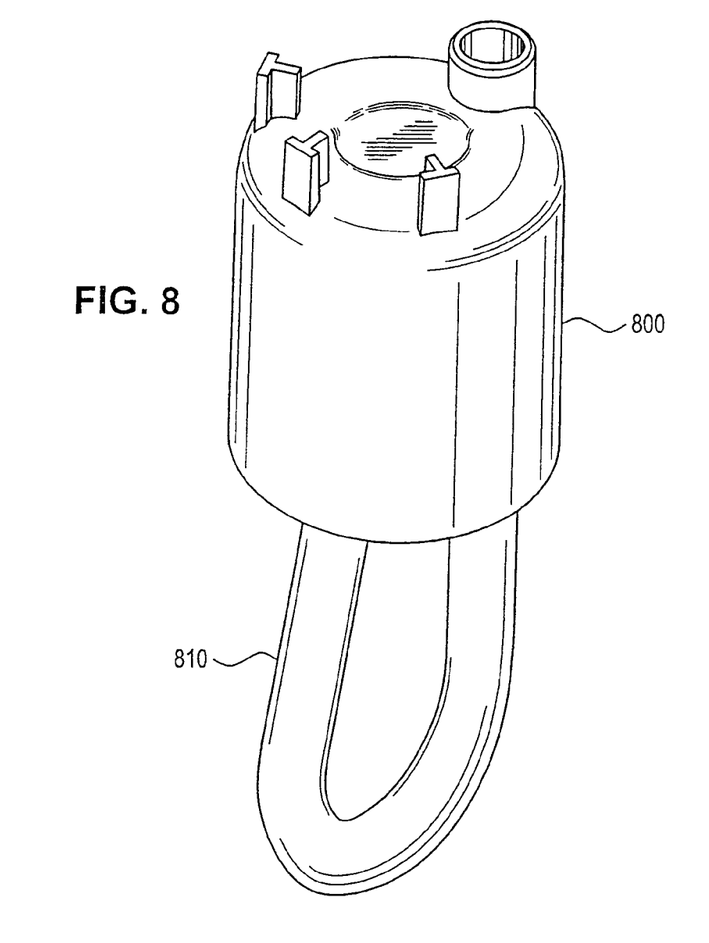
FIG. 8 illustrates a mobile refrigeration accumulator baffle portion of a refrigerant vapor/liquid separator, such as is used in the receive of an automobile air conditioning system, made in accordance with the present invention.
Figure 9:
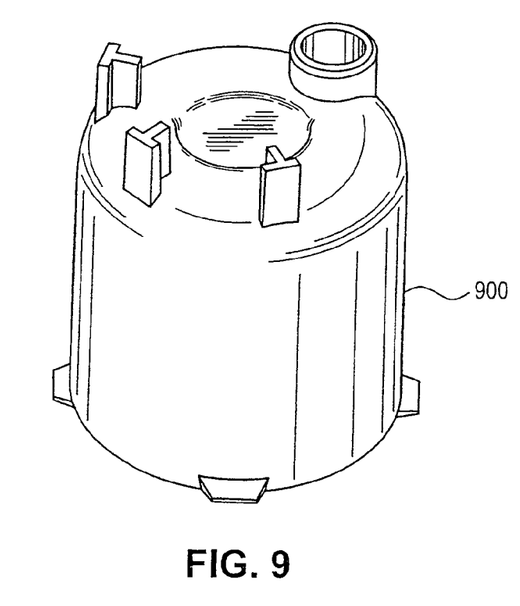
FIG. 9 illustrates a cap portion for the separator of FIG. 8.

Still another embodiment incorporating the present invention is shown in FIG. 8, which illustrates a mobile refrigeration accumulator upper portion 800 of a refrigerant vapor/liquid separator, such as is used in the receiver of an automobile air conditioning system. As can be seen in FIG. 8, accumulator upper portion 800 contains J-Tube 810 which is mounted within it. In this case, one or both of these pieces are molded from the resin bonded sorbent composition of the present invention. FIG. 9 illustrates cap 900 which would be placed over top accumulator upper portion 800. In a preferred embodiment of such an accumulator apparatus, both upper portion 800 and cap 900 would be injection molded and then welded, or possibly injection blow-molded in halves. Completing the device would be a lower portion (not shown) which could also be molded from the resin bonded sorbent composition of the present invention.

In order to demonstrate the benefits of the resin bonded sorbents of the present invention, the following experiments were performed:

EXAMPLE 1

Test samples of resin bonded sorbents were prepared according to the claimed invention employing the following protocols. The resins are procured from a supplier in pellet form (most common is cylindrical (0.03-0.12 inch diameter× 0.06-0.25 inch long), other forms included tear drop format (0.06-0.19 inch). The ratio of molecular sieve to the resin is determined by weight of the components. The resin was pre-mixed in a poly bag by hand (5-15 min). The pre-blend was emptied into the hopper of a Brabender single screw extruder. Action from the screw further blends and melts the resin and molecular sieve as it travels through the extruder barrel. The resin bonded sorbent then exits through the single strand die (1 circular hole) at the end of the extruder forming one strand of molten material. The nylon based resin was heated above 262° C. The strand was then cooled by air. The strands were broken into pieces. The pieces were placed in a hopper of an injection molding machine and parts molded. The parts were broken into pieces and re-introduced back into the injection molding machine where the tensile specimens (dog bones) were injection molded for testing.

The resin chosen was one known to be compatible with refrigerants used in modern air conditioning systems, specifically R-134a and R-152a. The resin was also compatible with compressor lubricants entrained in the refrigerant stream. The desiccant was the same as that most commonly used in conventional systems, namely a 3A or 4A molecular sieve.

For comparison, a commonly used reinforcing glass bead was compounded at about the same loading. Glass beads are added to a polymer melt to control shrinkage and to uniformly enhance mechanical properties. Glass beads were effective in this application because they bonded mechanically to the resin, so that after molding an isotropic structure resulted.

The compounded resin mechanical properties are compared with the pure polymer and with glass reinforced polymer in Table I.

TABLE I

Properties of Reinforced Nylon

| Property: | Nylon Neat | Molecular Sieve Reinforced Nylon | Glass Bead Reinforced Nylon |
|---|---|---|---|
| Loading (%) | 0 | 36.6 | 38.2 |
| Hardness - Shore D (ASTM D 2440) | 81.4 | 93 | 86.6 |
| Tensile Modulus (psi) (ASTM D 638) | 203779 | 307252 | 361470 |
| Tensile Displacement @ Max Load (in.) (ASTM D 638) | 0.62 | 0.144 | 0.132 |
| Tensile Stress @ Max. Load (psi) (ASTM D 638) | 10907 | 10519 | 10412 |
| Flex Modulus (psi) (ASTM D 790) | 336577 | 439087 | 506988 |
| Flex Displacement @ Yield (in.) (ASTM D 790) | 0.531 | 0.142 | 0.156 |
| Flex Stress @ Yield (psi) (ASTM D 790) | 17114 | 16662 | 15132 |
| Heat Deflection Temp. (° F.) (ASTM D 648) | 111.7 | 144.5 | 131.8 |

When the resin was reinforced, the hardness increased and with it the tensile displacement and flex displacement decreased dramatically as the material became more metal-like. Accordingly, the tensile and flex modulus were increased significantly. With glass and sorbent reinforced nylon (without glass reinforcement), the tensile and flex stress was substantially maintained. The important feature and the significance of this finding was that the properties of the sorbent reinforced nylon vary from pure nylon in the same way as does glass reinforced nylon, both in direction and magnitude. In addition, the heat deflection temperature was increased. Heat deflection temperature is a measure of heat resistance. This term is known among those skilled in the art. It is an indicator of the ability of the material to withstand deformation from heat over time. A further implication of the increased heat deflection temperature was an increase in the service temperature of a part molded from the sorbent reinforced resin.

It was also found that structures molded from sorbent reinforced nylon resin (without glass reinforcement) are isotropic as evidenced by the fact that tensile and flex modulus were substantially the same in one direction as another. As further evidence, shrinkage out of a mold is minimal and symmetrical.

EXAMPLE 2

Further experiments were performed using compositions comprising polypropylene, namely Huntsman Polypropylene 6106. This resin was also compatible with refrigerants, as well as with compressor lubricant. It was compounded in a similar fashion as nylon in Example 1, namely: 60% polypropylene resin and 40% molecular sieve Type 4A. The resin was heated above 174° C. The compounded resin had similar advantageous mechanical properties compared to the pure resin, and performs, structurally, close to that of a glass reinforced resin. Its properties are summarized in Table II. The values were determined by the same ASTM standards as provided in Table I.

TABLE II

Properties of Reinforced Polypropylene

| Property: | PP Neat | Molecular Sieve Reinforced Polypropylene | Glass Bead Reinforced Polypropylene | Glass Fiber Reinforced Polypropylene |
|---|---|---|---|---|
| Loading (%) | 0 | 37.5 | 41.9 | 39.4 |
| Hardness - Shore D | 66.8 | 74.6 | 65.6 | 75.4 |
| Tensile Modulus (psi) | 131242 | 228023 | 159321 | 342977 |
| Tensile Displacement @ Max Load (in.) | 0.330 | 0.137 | 0.274 | 0.222 |
| Tensile Stress @ Max. Load (psi) | 3583 | 3169 | 2188 | 15996 |
| Flex Modulus (psi) | 113251 | 219377 | 158136 | 737113 |
| Flex Displacement @ Yield (in.) | 0.597 | 0.356 | 0.468 | 0.176 |
| Flex Stress @ Yield (psi) | 14.368 | 14.298 | 9.781 | 60.7 |
| Heat Deflection Temp. (° F.) | 121.3 | 145.1 | 128.8 | n/a |

Reinforcement of polypropylene resulted in increased hardness and increases in tensile and flex modulus. For each of these properties the sorbent alone demonstrated even greater reinforcement effect than glass bead reinforcement. Accordingly, tensile displacement and flex displacement were reduced as the material became more rigid. Again, the effect of the sorbent was directionally the same as, but greater than glass bead reinforcement. Tensile and flex stress were reduced only slightly with sorbent reinforcement. However, the reduction was greater with glass reinforcement. With polypropylene, the reinforcement with sorbent was generally more effective than with glass bead reinforcement. The heat deflection temperature was increased. Here again, a further implication of the increased heat deflection temperature was an increase in the service temperature of a part molded from the sorbent reinforced resin.

Similarly, it was further found that structures molded from sorbent reinforced polypropylene resin were isotropic as evidenced by the fact that tensile and flex modulus were substantially the same in one direction, as another. As further evidence, shrinkage out of a mold was minimal and symmetrical.

EXAMPLE 3

As may be seen in Table III, melt flow was reduced with sorbent reinforced nylon compared with nylon neat (pure polymer) or glass bead reinforced nylon. Nevertheless it was in a workable range and was higher than polypropylene. Melt flow of sorbent reinforced polypropylene was improved relative to polypropylene neat or glass reinforced polypropylene.

TABLE III

Melt Flow Properties of Sorbent Reinforced Polymers

| Melt Flow Index (g/10 min) (ASTM D 1238) | Neat | Molecular Sieve Reinforced | Glass Bead Reinforced |
|---|---|---|---|
| Nylon | 56.3 | 14.7 | 55.5 |
| Polypropylene | 5.3 | 7.3 | 2.1 |

EXAMPLE 4

Moisture adsorption as a percentage of part weight is significant. This may be seen in Table IV. In practice, molecular sieve will adsorb about 25% of its own weight. It is reasonable then to expect a 40% loaded polymer to adsorb 10% of its own weight. In the case of nylon, however, adsorption reaches 13%. This was presumably the result of the action of the sorbent coupled with adsorption of some water by the nylon itself. The fact that the body as a whole adsorbs in excess of 10% indicates that the sorbent in addition to reinforcing the nylon was fully functional as a sorbent even though dispersed in the polymer. There was, in effect, a synergistic effect, or a double duty by the sorbent. Table IV shows results of adsorption at 36-38% molecular sieve loading.

TABLE IV

Adsorption Properties of Sorbent Reinforced Polymers

| Moisture Adsorption @ 29° C., 90% r.h. | 2 Days | 10 days | 23 days | 38 Days |
|---|---|---|---|---|
| Molecular Sieve Reinforced Nylon | 5.4% | 12.4% | 13% | 13% |
| Molecular Sieve Reinforced Polypropylene | 1.1% | 2.8% | 4.4% | 5.7% |

Polypropylene is hydrophobic and is thus much slower to adsorb moisture. But it is fully functional as a sorbent while being fully functional as a molding resin.

Additional applications of this invention are numerous. Such applications would include any resin bonded component or structure used in an air conditioning or refrigeration system. As discussed above, examples include J-tubes that are injection molded in halves and welded or possibly injection blow-molded, sleeve liners, coatings for an interior part or shell, co-injection molded composite structures, and insert molded filter-dryer assemblies. Diagnostic applications would include test strip substrates, case or supports for E-trans cases, containers or components of containers for diagnostic products. Pharmaceutical applications would include parts of a tablet container, such as a base, or closure, or the body of the container itself, an insert into a tablet container such as a bottom support or a neck insert to aid in dispensing, a thermoformed sheet or as a layer of a multilayer thermoformable sheet suitable for one-at-a-time or two-at-a-time dose dispensing from a blister or other compartmented package. Electronics and electro-optical device applications would include complete breather filter bodies, inserts for night vision sensor units, or inserts for rear view camera bodies.

It will be appreciated that there are many other potential applications for a desiccant loaded injection moldable resin in closed systems and sealed packaging applications. It must also be appreciated that a desiccant loaded injection molding resin can also be extruded into a rod or channel or any other shape with a uniform cross-section because extrusion is a less demanding process than injection molding.

Although the present invention has been particularly described in conjunction with specific preferred embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed is:

1. A multifunctional molding composition, which comprises at least a moisture adsorbing amount of a sorbent in combination with a resin, wherein said sorbent-resin combination is present in said composition as a resin bonded sorbent, said sorbent comprising a plurality of particles mixed throughout said resin in a miscible manner, said molding composition further characterized by enhanced mechanical properties when in the absence of an additive having a utility generally recognized for reinforcing articles of manufacture fabricated from resinous molding compositions.

2. The multifunctional molding composition according to claim 1, wherein said resin bonded sorbent is characterized by a mechanical bonding of said sorbent and resin.

3. The multifunctional molding composition according to claim 1, wherein said sorbent becomes wetted and miscible in said resin through a loss of crystallinity of said resin.

4. The multifunctional molding composition according to claim 1, wherein said resin is a thermoplastic resin and said sorbent is a member selected from the group consisting of molecular sieve, silica gel, activated carbon, activated alumina and clay.

5. The multifunctional molding composition according to claim 1, wherein said sorbent is a molecular sieve and said resin is a member selected from the group consisting of polyamide, polyolefin, styrenic polymer and a polyester.

6. The multifunctional molding composition according to claim 1, wherein said resin is an ethylene or a propylene-containing homopolymer or copolymer.

7. The multifunctional molding composition according to claim 1, wherein said resin bonded sorbent is formed with the aid of a coupling agent or a compatibilizing agent.

8. The multifunctional molding composition according to claim 7, wherein said coupling or compatibilizing agent is a member selected from the group consisting of reactive and non-reactive agents.

9. The multifunctional molding composition according to claim 8, wherein said reactive agent and non-reactive agent is a member selected from the group consisting of a metal, an acrylate, stearate, block copolymer, maleate, epoxy and a silane.

10. The multifunctional molding composition according to claim 1, wherein said resin bonded sorbent comprises from about 25 to about 55 wt % sorbent and from about 45 to about 75 wt % resin.

11. The multifunctional molding composition according to claim 1, wherein said resin bonded sorbent comprises from about 35 to about 42 wt % sorbent and from about 58 to about 65 wt % resin.

12. A multifunctional molding composition, which comprises at least a moisture adsorbing amount of a sorbent in combination with reinforcing agent and a resin, wherein said reinforcing agent is present in said composition in a lesser amount than would otherwise be introduced in the absence of said sorbent, said sorbent comprising a plurality of particles mixed throughout said resin in a miscible manner.

13. A molded article of manufacture fabricated from the multifunctional molding composition according to claim 1.

14. The molded article of manufacture according to claim 13, which is a refrigeration or air conditioning cycle component.

15. The molded refrigeration or air conditioning cycle component according to claim 14, wherein the component is a member selected from the group consisting of a U-tube assembly; a liner or sleeve; accumulator, plug/filter assembly; integral threaded plug and filter, and accumulator-J-tube and cap.

16. A molded article of manufacture fabricated from the multifunctional molding composition according to claim 12.

17. The molded article of manufacture according to claim 13, which is a refrigeration or air conditioning cycle component.

18. A method for manufacturing a component for a refrigeration cycle, which comprises the steps of:
(i) forming a multifunctional molding composition, which comprises at least a moisture adsorbing amount of a sorbent in combination with a resin, wherein said sorbent-resin combination is present in said composition as a resin bonded sorbent, said sorbent comprising a plurality of particles mixed throughout said resin in a miscible manner, said molding composition further characterized by enhanced mechanical properties when in the absence of an additive having a utility generally recognized for reinforcing articles of manufacture fabricated from resinous molding compositions, and
(ii) molding said component from said composition.

* * * * *